United States Patent
Akuka et al.

(10) Patent No.: US 10,521,252 B2
(45) Date of Patent: Dec. 31, 2019

(54) WEB FLOW AUTOMATED EXECUTOR

(71) Applicant: SAP PORTALS ISRAEL LTD., Ra'anana (IL)

(72) Inventors: Gad Akuka, Pardes Hanna-Karkur (IL); Yan Vulich, Kiryat Ono (IL); Shahar Arusi, Moshav Yagal (IL)

(73) Assignee: SAP PORTALS ISRAEL LTD, Ra'anana (IL)

( * ) Notice: Subject to any disclaimer, the term of this patent is extended or adjusted under 35 U.S.C. 154(b) by 56 days.

(21) Appl. No.: 15/656,145

(22) Filed: Jul. 21, 2017

(65) Prior Publication Data

US 2019/0026123 A1    Jan. 24, 2019

(51) Int. Cl.
*G06F 3/0481* (2013.01)
*G06F 9/451* (2018.01)
*G06F 3/0489* (2013.01)
*G06F 3/0482* (2013.01)

(52) U.S. Cl.
CPC .......... *G06F 9/453* (2018.02); *G06F 3/04812* (2013.01); *G06F 3/04895* (2013.01); *G06F 3/0482* (2013.01)

(58) Field of Classification Search
CPC ......................................................... G06F 9/44
See application file for complete search history.

(56) References Cited

U.S. PATENT DOCUMENTS

| | | | |
|---|---|---|---|
| 9,875,235 B1* | 1/2018 | Das | G06F 17/2705 |
| 2004/0133888 A1* | 7/2004 | Ard | G06F 8/61 717/174 |
| 2009/0138801 A1* | 5/2009 | Schober | G06F 9/453 715/712 |
| 2010/0083182 A1* | 4/2010 | Liu | G06Q 10/10 715/843 |
| 2013/0018994 A1* | 1/2013 | Flavel | H04L 41/0806 709/220 |
| 2013/0074013 A1* | 3/2013 | Tapiola | G06F 3/04883 715/859 |
| 2014/0281967 A1* | 9/2014 | Bodnick | G06Q 10/06316 715/708 |
| 2016/0085410 A1* | 3/2016 | Kwon | G06F 3/04886 345/173 |
| 2019/0026123 A1* | 1/2019 | Akuka | G06F 9/453 |

* cited by examiner

*Primary Examiner* — David E Choi
(74) *Attorney, Agent, or Firm* — Buckley, Maschoff & Talwalkar LLC

(57) ABSTRACT

A method and system are provided including a display; a memory storing processor-executable steps; and a flow executor processor coupled to the memory, and operative to execute the processor-executable process steps to cause the system to: present a user interface on a display, the user interface including one or more selectable actions; present a flow executor indicator; in response to a user selection of the flow executor indicator, guide a user to select one of at least one flow presented on the user interface; in response to a user selection of the flow, generate, via a flow executor module, at least a first step associated with the selected flow, wherein execution of the at least one step by the user executes the flow; and present the at least one step on the user interface. Numerous other aspects are provided.

27 Claims, 15 Drawing Sheets

WEB FLOW AUTOMATED EXECUTOR

BACKGROUND

Users typically operate one or more web applications on a suitable computing device. Occasionally, a user may require assistance in the operation of such a web application. In some instances, the user may invoke a locally-installed help mechanism to receive this assistance. The help mechanism may display a static window including a list of steps. The static window may close when a new window opens, and might not be frequently updated. The list of steps may also be restricted to a predefined set of actions.

Systems and methods are desired which support efficient use of web applications.

DETAILED DESCRIPTION

Figure 1:
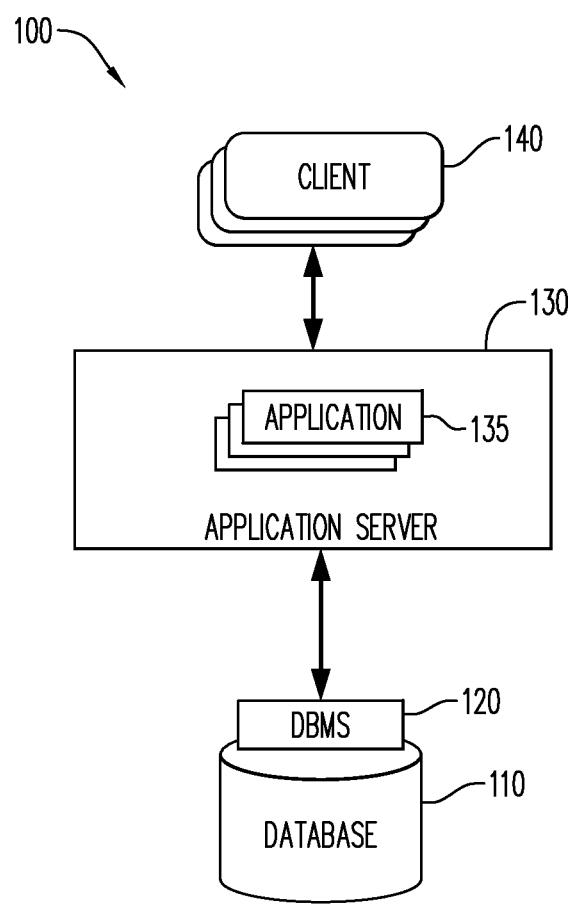
FIG. 1 is a block diagram of a system architecture according to some embodiments.

The following description is provided to enable any person in the art to make and use the described embodiments and sets forth the best mode contemplated for carrying out some embodiments. Various modifications, however, will remain readily apparent to those in the art.

One or more embodiments or elements thereof can be implemented in the form of a computer program product including a non-transitory computer readable storage medium with computer usable program code for performing the method steps indicated herein. Furthermore, one or more embodiments or elements thereof can be implemented in the form of a system (or apparatus) including a memory, and at least one processor that is coupled to the memory and operative to perform exemplary method steps. Yet further, in another aspect, one or more embodiments or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

A user may open a web application ("application") via a web browser to perform some action. For example, the user may want to check customer orders. After opening the application, the user may not be sure of the steps to take to check the customer orders. The user may then launch a conventional help mechanism. In some instances, it may be required to install the conventional help mechanism locally on the user's device before it can be launched. After launching the conventional help mechanism, the user then may have to navigate to the appropriate section of the conventional help mechanism. For example, the user may have to enter keywords into a search box provided by the conventional help mechanism, or click through different nested contents.

The conventional help mechanism may then provide a static display of steps for the user to follow. For example, the conventional help mechanism may provide an inactive tutorial that describes the steps in text but which may be hard to understand, or a video guide that may require signficant storage space and network bandwidth. In some instances, the steps may apply to multiple windows or pages of the website, and the static display may block the user interface and may close when the application opens a new window/page, making it difficult and frustrating for the user to complete the steps. In some instances, with applications being hosted in a cloud environment, while the application may be updated frequently, the conventional help mechanism may not be updated frequently, so an updated help mechanism may not be available for the newest version of the application. Additionally, the static display of steps may be restricted to a predefined scenario, and may suggest the same help, no matter the user or user data, which may not be helpful if the user needs to deviate from that scenario.

Some embodiments may provide an interactive automated web flow executor (e.g., Flow Executor module) that may play tutorial actions in an interactive way on a live website system by simulating browser events, like mouse movements/clicks, and/or highlighting areas of the live web site, with an accompaniment of explanatory text. In some embodiments, the Flow Executor module may wait until a user action is completed (e.g., like entering data or selecting an option control, etc.) prior to proceeding to the next step in a flow. The Flow Executor module may detect the user is not performing a process as expected, and the tutorial actions may launch automatically in one or more embodiments. Some embodiments may invoke predefined JavaScript events that may be executed in the context of the live web site and use of the interactive automated web flow executor may be akin to an instructor sitting next to the user and explaining the next step.

One or more embodiments may be completely implemented in JavaScript and may be provided to the end user as part of the web service and running within the browser. The inventors note a benefit of running within the browser is that the end user does not need to install additional tools. Rather, the website owner may only need to add one code line (e.g., "load a JavaScript") to the site pages to have the Flow Executor module run on the web site. The inventors also note a benefit of running within the browser and being executed in the same session as the end user may be that the Flow Executor module may use back-end data (e.g., user's cookies, history, log, etc.) to make decisions on which step in a flow to provide. The inventors note that while the examples described herein are for setting up the Flow Executor module for a specific web page, since JavaScript is used, an application developer or administrator may make a template that may be used on a related group of pages (e.g., different pages with a similar functionality).

As used herein, a "web application" is an application program that is stored on a remote server and delivered over the Internet through a web browser interface. As used herein, a web browser is a software application for retrieving, presenting and traversing information resources provided by web servers (e.g., the World Wide Web or private networks or file systems). As used herein, a "computing device" may refer to any electronic equipment controlled by a central processing unit, including desktop and laptop computers, smart phones, tablets and any IoT device.

Some embodiments provide for the process to begin with an administrator or developer creating a set of rules for every available action provided by an application that may be executed by an end user. In embodiments, the "action" may be associated with a flow or set of rules. As used herein, the terms "flow" and "set of rules" or "rule set" may be used interchangeably. For example, if the action is "approve customer orders," the rule set or flow may include opening a customer order dialog box, selecting a "view" button to view the order, and selecting an "approve" button to approve the order. In some embodiments, multiple rule sets may be provided for each action, as the end user may perform different steps in execution of the action. Continuing with the "approve customer orders" action example, after selecting a "view" button, the next step may be selecting "view order history" button or "change order" button or "contact customer" button. The inventors note that a benefit of one or more embodiments is the access to a user's data. For example, some orders may be approved directed from the Purchase Order (PO) list, others may need special attention (e.g., a missing field in order details or order price changes in comparison to the similar order history).

In embodiments, after the rule set is created, it may be available for an end user to execute when using the web application. The end user process may begin with the end user accessing a web application. In a first instance, if the end user indicates they need help to perform an action by selecting a help indicator button, or in a second instance, if the end user does not perform any action for a pre-set amount of time, the Flow Executor module may be started. In either instance, the Flow Executor module may ask the end user what he needs help with. The question may be asked via a dialog box and answered via a text-entry field, for example. Other suitable question and answer mechanisms may be used. The Flow Executor module may also suggest flows that the end user may need help with. The suggested flow may be based on, for example, the position of the cursor on a user interface screen, the functions the flow executor module may provide, information provided by the end user about the action they want to perform, and end user history with the web application.

In response to the end user selecting a flow, the Flow Executor module may provide a next step in the flow. The end user may then perform the step provided by the Flow Executor module, or may perform a different step. A subsequent step is then provided by the Flow Executor module based on the previous step actually performed by the end-user. The Flow Executor module may continue to provide a next step in some flow until one of the flow is complete or the end user cancels the execution of the Flow Executor module. The inventors note a benefit of some embodiments is the provision of an interactive and dynamic help tool that may actively guide users through multiple pages or complex flows on a live system, without third party tools. Benefits of one or more embodiments include the provision of a simple set of actions (e.g., move/clock mouse, input text, select checkbox, wait for user text, etc.) that may be combined to create the flow.

FIG. 1 is a block diagram of system architecture 100 according to some embodiments. Embodiments are not limited to architecture 100 or to a three-tier database architecture.

Architecture 100 includes database 110, database management system (DBMS) 120, application server 130, applications 135 and clients 140. Applications 135 may comprise server-side executable program code (e.g., compiled code, scripts, etc.) executing within application server 130 to receive queries from clients 140 and provide results to clients 140 based on data of database 110. One such application 135 may comprise a customer orders website application, for example.

Application server 130 provides any suitable interfaces through which clients 140 may communicate with applications 135 executing on application server 130. For example, application server 130 may include a HyperText Transfer Protocol (HTTP) interface supporting a transient request/response protocol over Transmission Control Protocol/Internet Protocol (TCP/IP), a WebSocket interface supporting non-transient full-duplex communications which implement the WebSocket protocol over a single TCP/IP connection, and/or an Open Data Protocol (OData) interface.

One or more applications 135 executing on server 130 may communicate with DBMS 120 using database management interfaces such as, but not limited to, Open Database Connectivity (ODBC) and Java Database Connectivity (JDBC) interfaces. These types of applications 135 may use Structured Query Language (SQL) to manage and query data stored in database 110.

DBMS 120 serves requests to retrieve and/or modify data of database 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Application server 130 may be separated from, or closely integrated with, DBMS 120. A closely-integrated application server 130 may enable execution of server applications 135 completely on the database platform, without the need for an additional application server. For example, according to some embodiments, application server 130 provides a comprehensive set of embedded services which provide end-to-end support for Web-based applications. The services may include a lightweight web server, configurable support for OData, server-side JavaScript execution and access to SQL and SQLScript.

Application server 130 may provide application services (e.g., via functional libraries) which applications 135 may use to manage and query the data of database 110. The application services can be used to expose the database data model, with its tables, hierarchies, views and database procedures, to clients. In addition to exposing the data model, application server 130 may host system services such as a search service.

Database 110 may store data used by applications 135. Continuing with the customer order web application example, database 110 may include information (e.g., customer data, order data, etc.), and/or any other data for providing in a customer orders web application.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. The data of database 110 may be distributed among several relational databases, dimensional databases, and/or other data sources. Embodiments are not limited to any number or types of data sources.

In some embodiments, the data of database 110 may comprise one or more of conventional tabular data, row-based data, column-based data, and object-based data. Moreover, the data may be indexed and/or selectively replicated in an index to allow fast searching and retrieval thereof. Database 110 may support multi-tenancy to separately support multiple unrelated clients by providing multiple logical database systems which are programmatically isolated from one another.

Database 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each client 140 may comprise one or more individuals or devices executing program code of a software application for presenting user interfaces to allow interaction with application server 130 and between each other. Presentation of a user interface as described herein may comprise any degree or type of rendering, depending on the type of user interface code generated by application server 130.

For example, a client 140 may execute a Web Browser to request and receive a Web page (e.g., in HTML format) from a website application 135 of application server 130 via HTTP, HTTPS, and/or WebSocket, and may render and present the Web page according to known protocols. One or more of clients 140 may also or alternatively present user interfaces by executing a standalone executable file (e.g., an .exe file) or code (e.g., a JAVA applet) within a virtual machine. An end user may then elect to receive help executing a flow via the Flow Executor module.

As used herein, devices, including those associated with the system 100 and any other devices described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Near Field Communication ("NFC") network; a Web Real-Time Communication (RTC) network; a Bluetooth network, a wireless LAN network, and/or an Internet Protocol ("IP") network such as the Internet, an intranet, or an extranet. Note that any devices described herein may communicate via one or more such communication networks.

Figure 2:
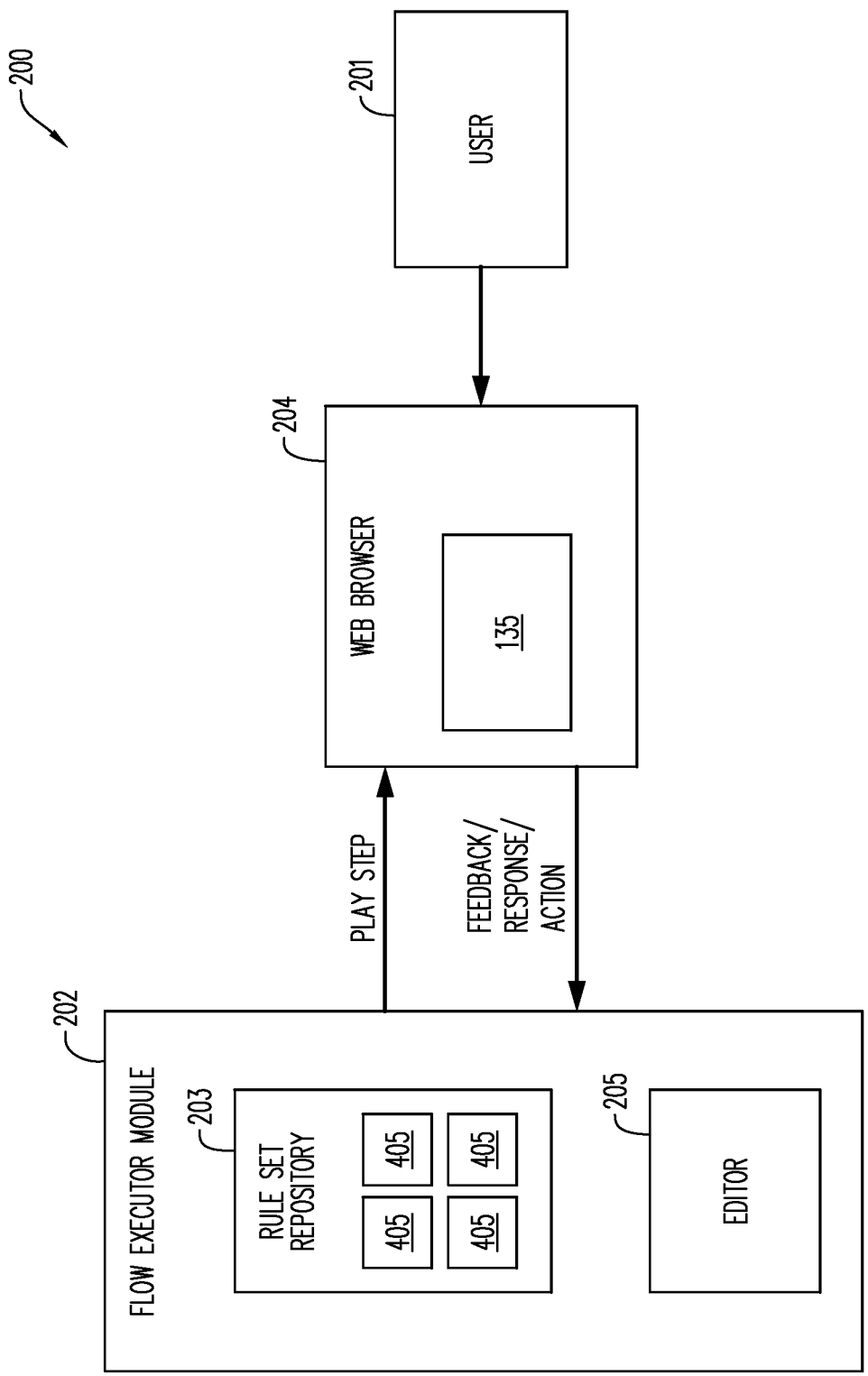
FIG. 2 is block diagram of a system architecture according to some embodiments.
Figure 3:
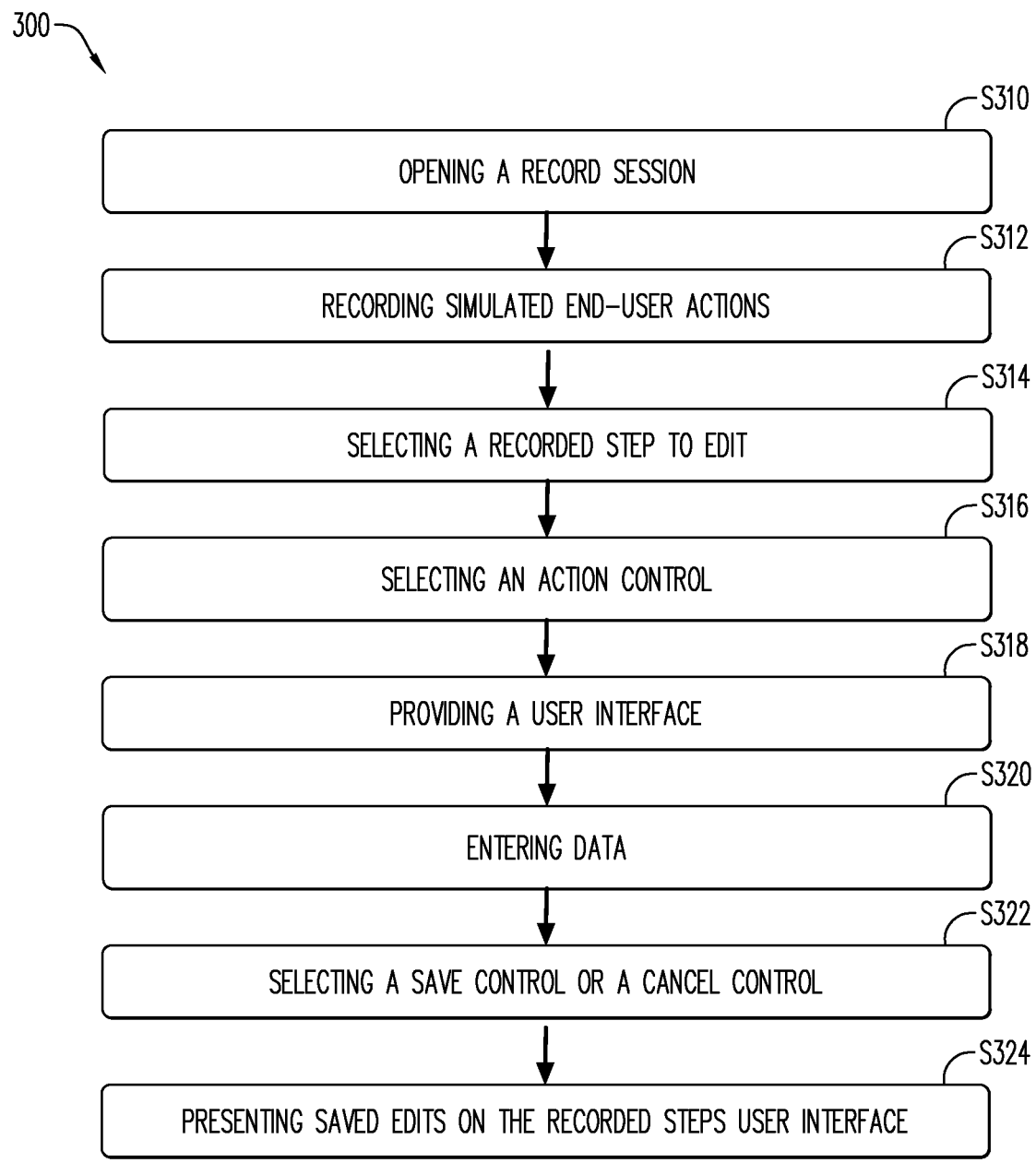
FIG. 3 is a flow diagram of a process according to some embodiments.
Figure 4:
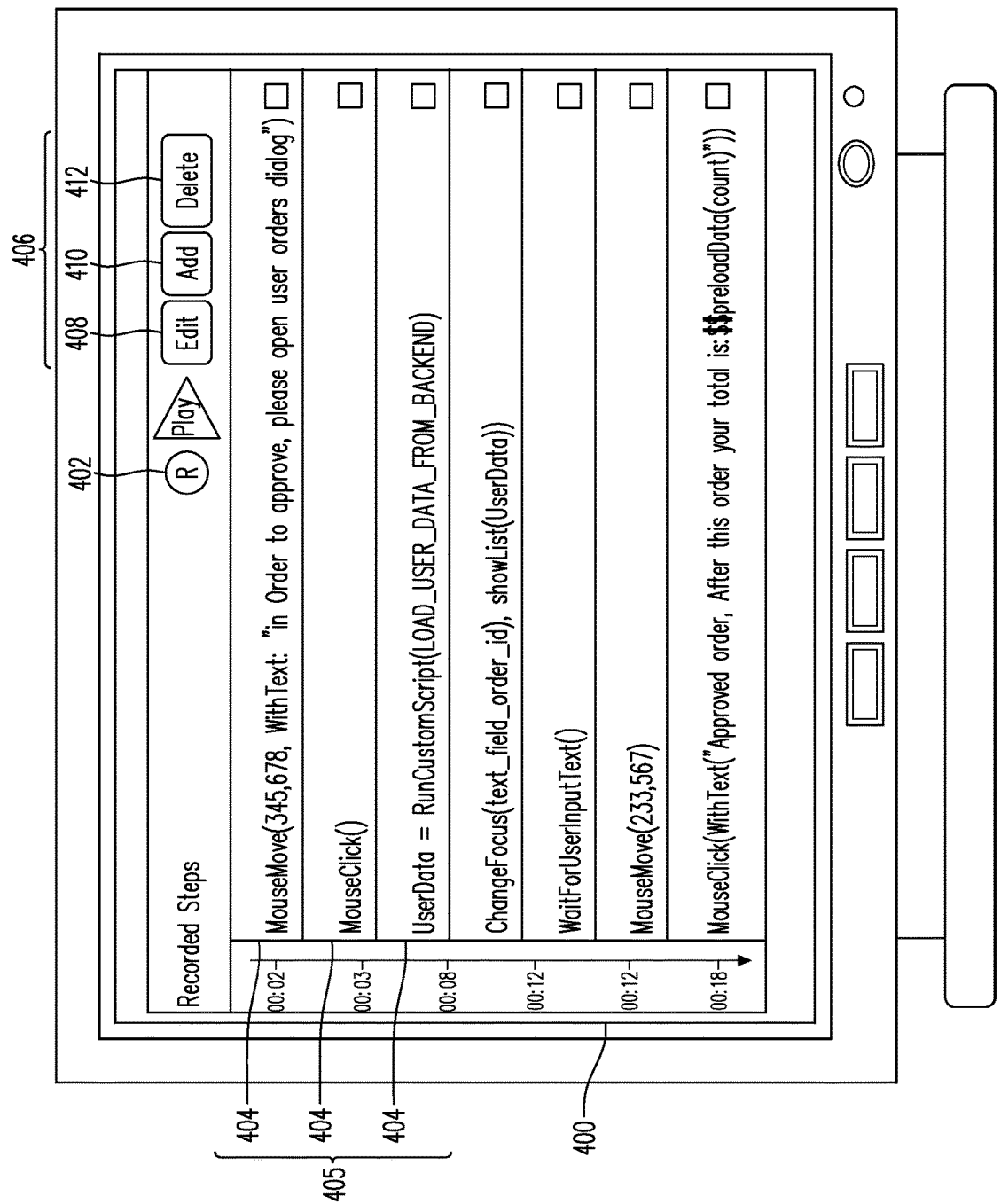
FIG. 4 is an outward view of a graphical interface according to some embodiments.
Figure 5:
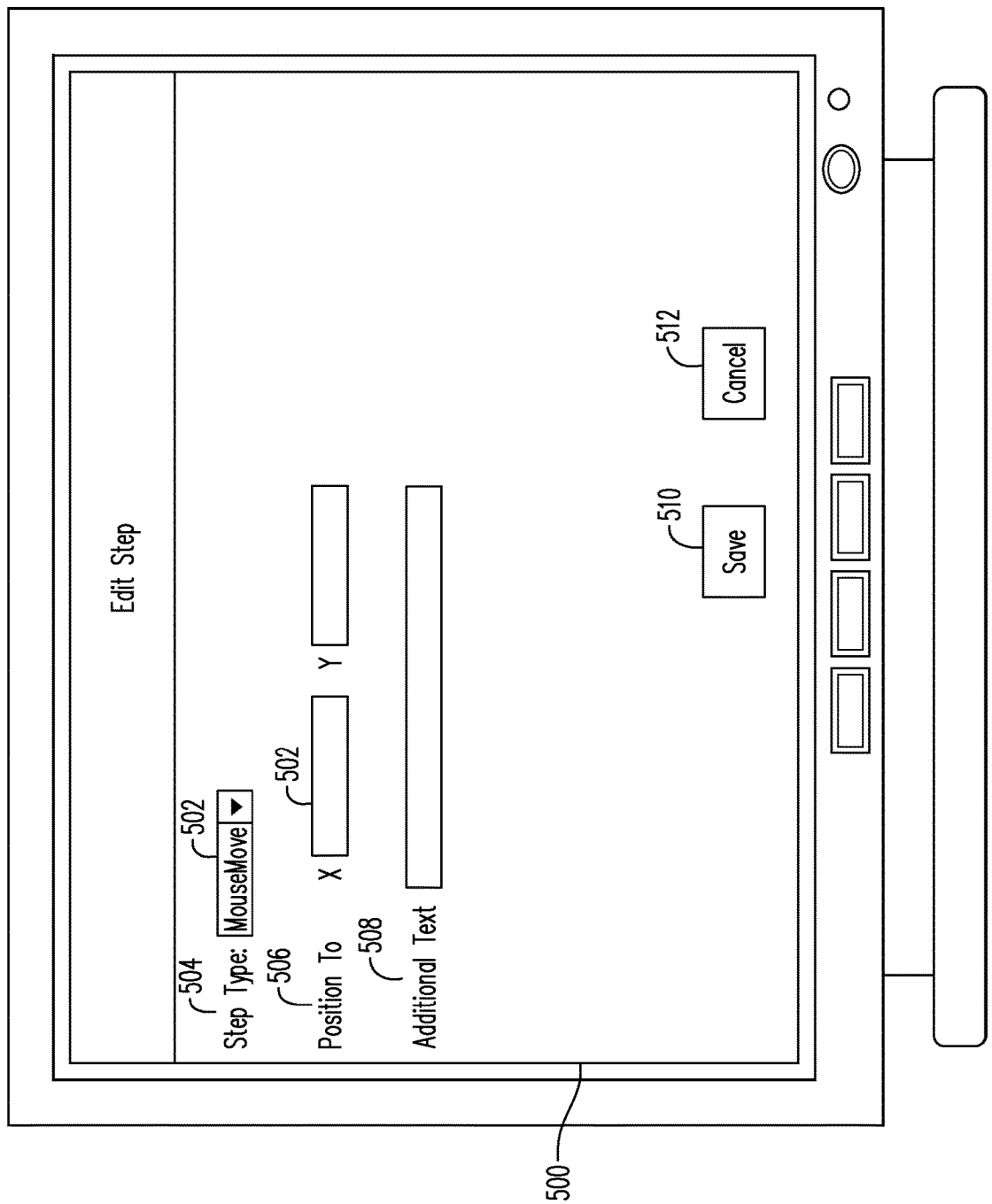
FIG. 5 is an outward view of a graphical interface according to some embodiments.
Figure 6:
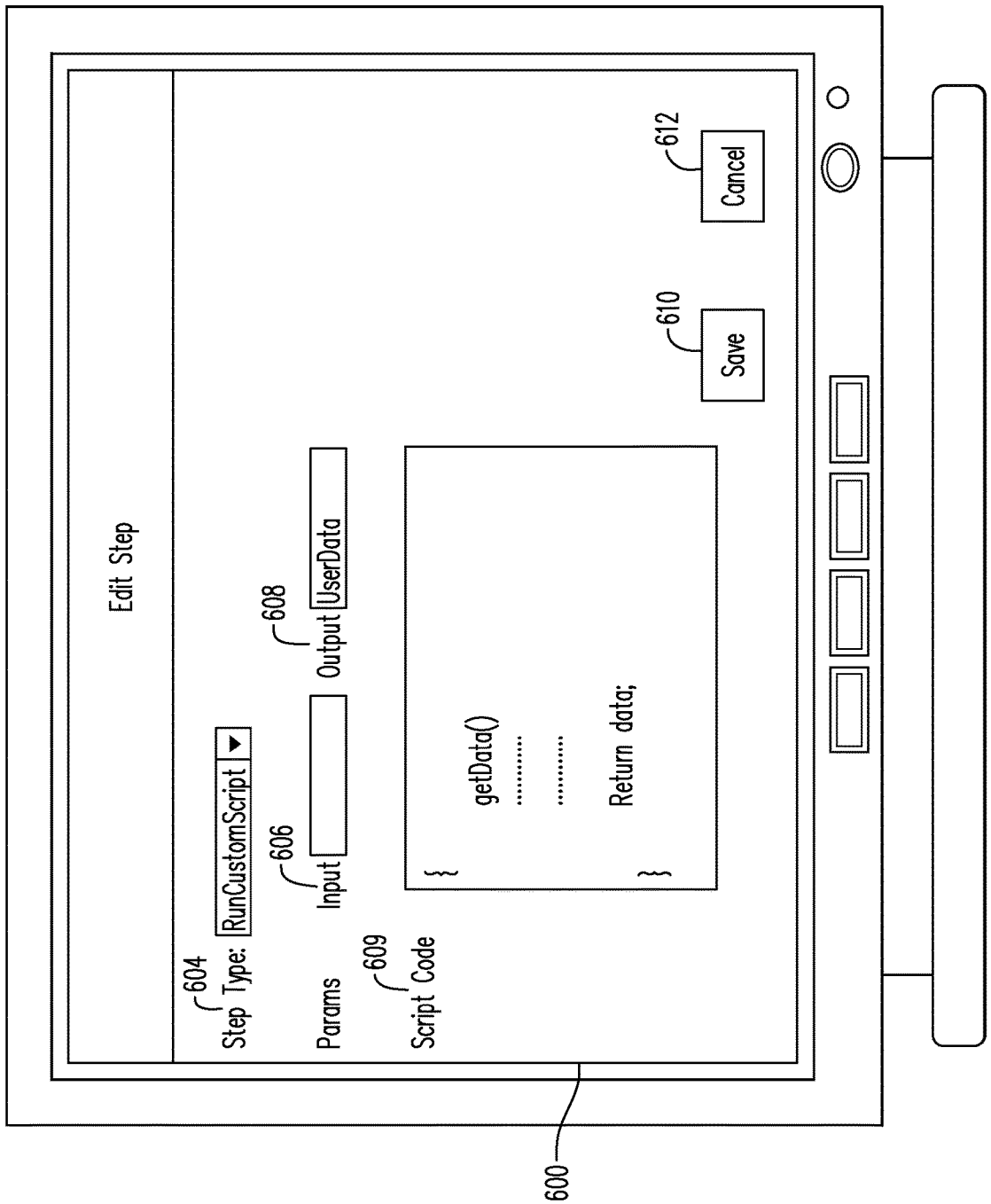
FIG. 6 is an outward view of a graphical interface according to some embodiments.

FIGS. 2-14 include an architecture (FIG. 2) and flow diagram of processes 300 (FIG. 3) and 700 (FIG. 7) according to some embodiments. Processes 300/700 may be executed by application server(s) 130 according to some embodiments, to provide a user with access to the user interface 400/800 (FIGS. 4/8). In one or more embodiments, the application server(s) 130 may be conditioned to perform the processes 300/700, such that a processor 1510 (FIG. 15) of the server 130 is a special-purpose element configured to perform operations not performable by a general-purpose computer or device.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software. Examples of these processes will be described below with respect to embodiments of the system, but embodiments are not limited thereto. The flow chart(s) described herein do not imply a fixed order to the steps and embodiments of the present invention may be practiced in any order that is practicable.

User interface 400, 800 may be presented on any type of display apparatus (e.g., desktop monitor, smartphone display, tablet display) provided by any type of client device (e.g., desktop system, smart device, tablet computer). The application which is executed to provide user interface 400/800 may comprise a Web Browser, a standalone application, or any other application. Embodiments are not limited to user interface 400, 800 of FIGS. 4 and 8.

As used herein, the term "smart device" refers to any device (e.g., cellular phone, tablet, watch, ring, etc.) that is able to perform many of the functions of a computer, typically having a relatively large screen and an operating system capable of running general- and specific-purpose applications. As used herein, the term "tablet" refers to a general-purpose computer contained in a single panel, typically using a touch screen as the input device capable of running general- and specific-purpose applications. However, other input devices (e.g., keyboard, mouse, etc.) may be coupled to the tablet for use as input devices. Tablets and smart devices may typically come loaded with a web browser and a variety of applications ("apps"). As used here, the term "app" refers to a self-contained program or piece of software designed to fulfill a particular purpose.

Process 300 will be described with respect to FIGS. 2 and 4 to 6 and 15 and the creation of a rule set repository in the Flow Executor module 202 to create a script or flow that may run for the end user when the end user needs help.

Initially at S310, a user 201 may open a record session for the web application 135 in the web browser 204. The user may be an administrator or application developer, or any other suitable user. As used herein the terms "administrator" and "application developer" may be used interchangeably. Then at S312, the administrator may interact with the web application 135 to simulate end-user actions, while a rule set repository 203 of the Flow Executor module 202 records each action. The end user actions may include mouse_click (text), mouse_move (x, y, text), Input_text_field (text), and any other suitable action.

In one or more embodiments, the recording of the session may start via selection of a record control 402 (FIG. 4) or other suitable recording initiation means. FIG. 4 provides a user interface 400 showing the steps 404 recorded during a recorded session. For example, at time 00:02, a MouseMove was recorded, at 00:03, a MouseClick was recorded, and at 00:08, UserData was entered. After the session is recorded, the administrator may edit the recorded steps via an editor 205 associated with the Flow Executor module 202 to create a set of rules or flows 405 for an end user. In one or more embodiments, the flow 405 is one or more steps to complete an action. In one or more embodiments, the administrator may edit the recoded steps after the entire session is recorded or before recordation of the entire session has been completed.

At S314, the administrator may select a recorded step 404 to edit. In one or more embodiments, the recorded step 404 may be selected by highlighting the recorded step, marking a check-box or by any other suitable selection mechanism. Next, in S316, the administrator may select an action control 406. The action control 406 may be an edit control 408, an add control 410, a delete control 412, or any other suitable control. In one or more embodiments, the action button 406 may be selected to perform an action on the recorded steps 404. For example, when the MoveMouse recorded step at 00:02 is selected in S314, the administrator may then select the edit control 408 in S316. In response, the user interface 500 (FIG. 5) may be provided in S318.

The administrator may enter data in one or more data-entry fields 502 in S320. For example, the administrator may categorize 504 the type of step being edited (e.g., MoveMouse, MouseClick, UserData, ChangeFocus, etc.), and enter at least one of a mouse position 506 and additional text 508. In the example shown herein, the administrator may enter a mouse position of 345 in the X mouse position 506 and 678 in the Y mouse position 506, and may enter additional text 508 "in order to approve, please open user orders dialog". When the flow is being executed, as described below with respect to FIG. 7, and the end user moves their mouse to the X position of 345 and the Y position of 506, a dialog box may be presented that states, "in order to approve, please open user orders dialog." In one or more embodiments, the user may actively ask for assistance at any step of the process. Additionally, in one or more embodiments, a dialog box or other assistance element may automatically open when the Flow Executor module identifies that the user is idle/hesitates, as described below with respect to FIG. 7. In one or more embodiments, when the user selects a step different from the step suggested by the help, the help may remain silent.

As another example, the administrator may enter a mouse position of 233 in the X mouse position 506 and 568 in the Y mouse position 506, as shown at time 00:12 in FIG. 4, without any additional text. When this step at 00:12 is executed as part of the flow by the end user, a cloned mouse (e.g., a gif file of the mouse cursor) may move to this coordinate to show the end user where the end user should move their mouse. In one or more embodiments, the cloned mouse may not interfere with the action and may not block aspects of the user interface. For example, the cloned mouse (and associated dialog box) may be transparent in one or more embodiments to not block aspects of the user interface. In embodiments, the cloned mouse may imitate movement and clocking of the actual mouse on top of the web site, without moving the actual mouse. When the administrator has completed editing the step 404, the administrator may select a save control 510 or a cancel control 512 in S322. In one or more embodiments, the saved edits may then appear on the recorded steps user interface 400 shown in FIG. 4 in S324. Since the cloned mouse imitates the actions the user should do, the system may recognize a cloned mouse action versus an actual mouse movement, which is the user's input.

As another example, the administrator selects the recorded step 404 at time 00:08 to edit in S314, and then selects the edit control 408 in S316. User Interface 600 (FIG. 6) may then be provided in S318. The administrator may categorize 604 the type of step being edited as RunCustomScript, and may include input parameter(s) 606 and output parameter(s) 608. As shown herein, the output parameter 608 is UserData. In one or more embodiments, the RunCustomScript category 604 may have associated script code 609 that may be entered by the administrator. As described above, when the administrator has completed editing the step 404, the administrator may select a save control 610 or a cancel control 612 in S322. In one or more embodiments, the saved edits may then appear on the recorded steps user interface 400 shown in FIG. 4 in S324. For example, the step 404 at 00:08 may reference the custom script entered in 610.

In one or more embodiments, the administrator may change the order of the recorded steps to create an order of steps that may appear to an end user when they request assistance with this particular flow, as described further below. For example, the steps 404 at 00:03 and 00:02 may be switched.

While examples of editing steps via selection of the edit control 408 are described above, the administrator may also add steps 404 to the flow via selection of the add control 410, and delete steps 404 from the flow via selection of the delete control 412 to create a flow for the end user. The inventors note that multiple flows may be created for assisting the end user with a same task, where each flow may have one or more different steps 404. The different steps 404 may account for different end user actions. For example, in 00:12, the cloned mouse moves to coordinate 233, 567 to show the end user where to move his mouse. If the end user does move his mouse to 233, 567, the next step 404 provided to the end user is the step at 00:18 which is text "click mouse to approve order, after this order your total is: $$preloadData(count)")), where "$$preloadData(count)" is replaced by the total provided by that program. If the end user does not move his mouse to 233, 567, another step 404 may be provided to the end user at 00:18, based on what the end user actually does in response to the step at 00:12.

Figure 7:
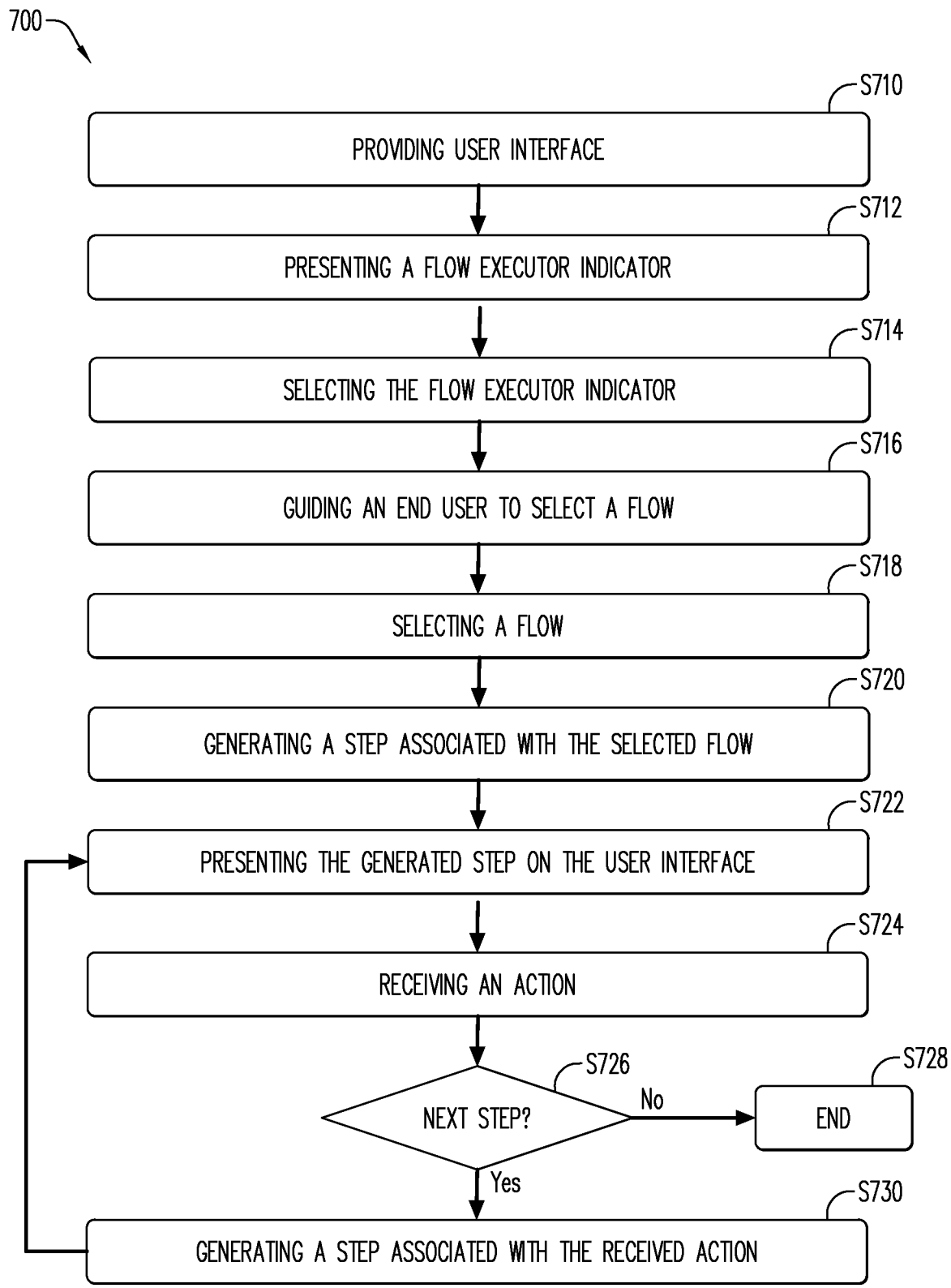
FIG. 7 is a flow diagram of a process according to some embodiments.
Figure 8:
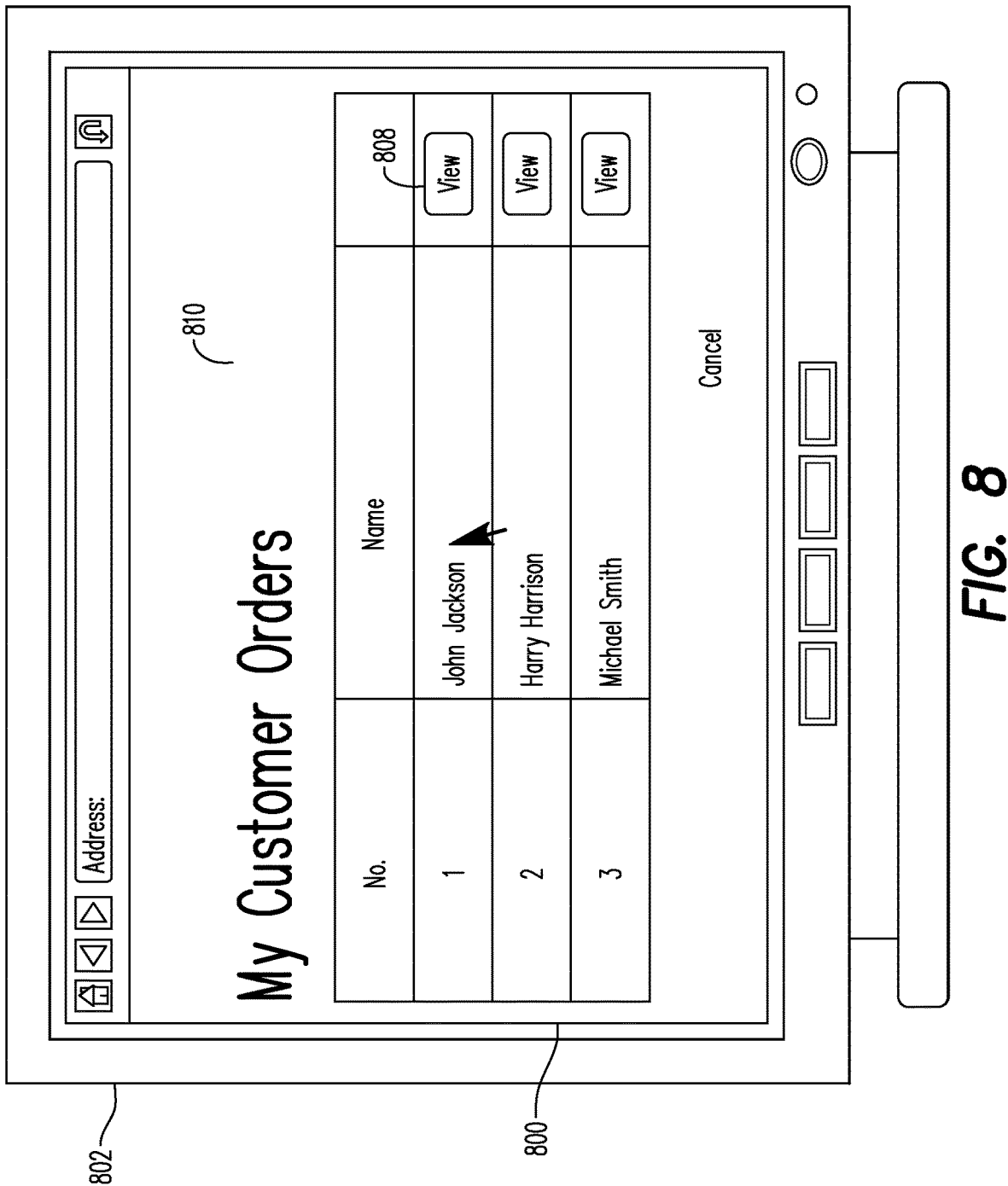
FIG. 8 is an outward view of a graphical interface according to some embodiments.
Figure 9:
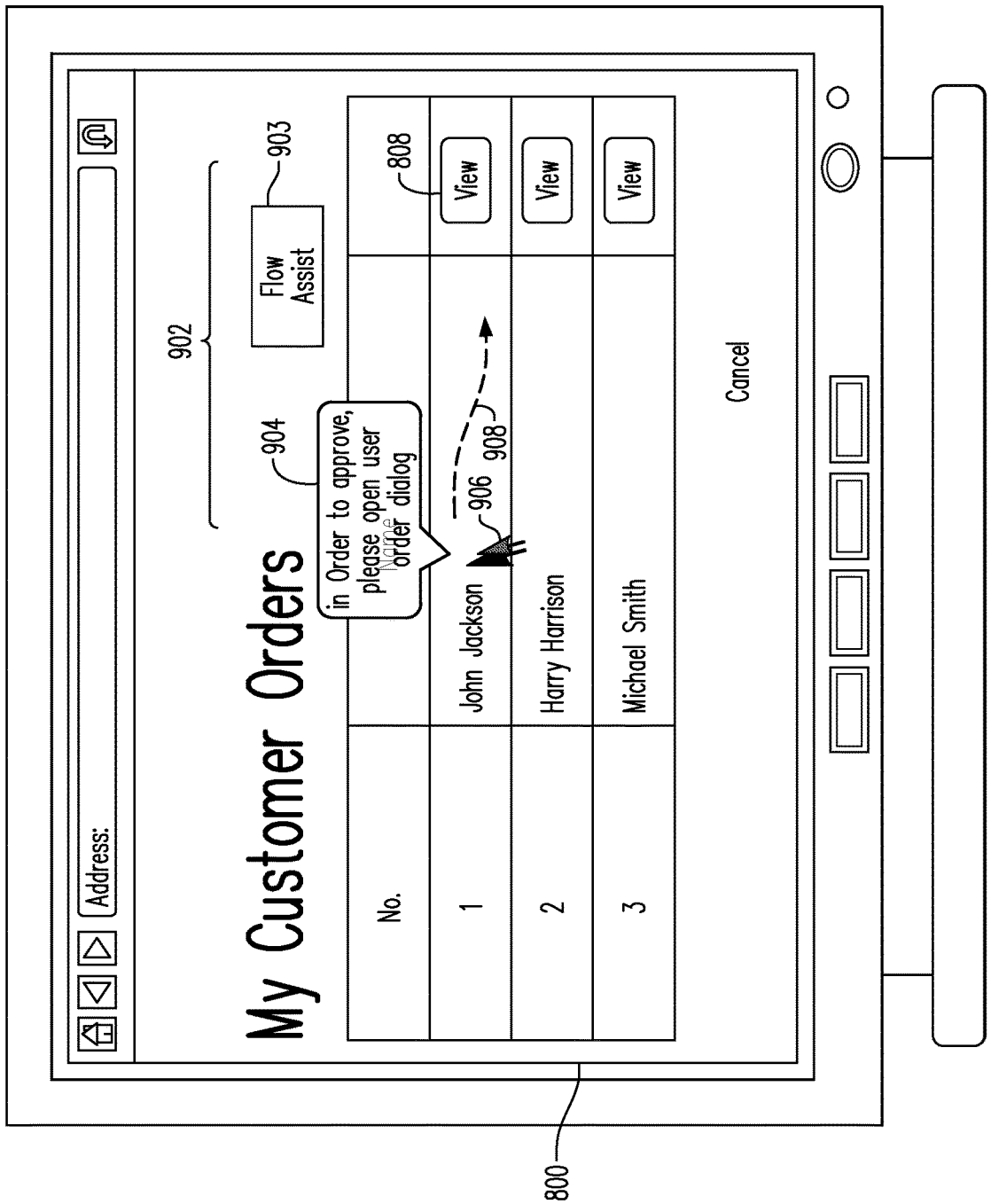
FIG. 9 is an outward view of a graphical interface according to some embodiments.

Turning to FIG. 7, process 700 describes the execution of a flow by the Flow Executor module 202 for the end user when the end user needs help. Process 700 is described with respect to FIGS. 2 and 7 to 14.

Initially at S710, a user interface 800 (FIG. 8) is provided by a web browser 202. The user interface 800 may be displayed on a user device 802. As described above, the user device 802 may be any electronic equipment controlled by a central processing unit, including desktop and laptop computers, smart phones, tablets and any IoT device. In one or more embodiments, the user interface 800 may be associated with a web application 135. The user interface 800 may include one or more elements 804. The elements 804 may include one or more user entry fields 1201 (FIG. 12), one or more selectable controls 808, and one or more displays 810. In one or more embodiments, the web application 135 may be at least one of HTML, JavaScript, and elements that JavaScript can support (e.g., JSON). Any other suitable computing language may be used for the web application 135.

Then in S712, a Flow Executor Indicator 902 is presented. In one or more embodiments, the Flow Executor Indicator 902 may be presented via a Flow Executor control 903 or a dialog box 904 and cloned mouse 906. In one or more embodiments, the dialog box 904 may be an explanation of the cloned mouse 906 movement. For example, in one or more embodiments, the Flow Executor control 903 may be displayed on the user interface 800 when the user interface is provide 800, and an end user (not shown) may request assistance in executing a flow by selecting the Flow Executor control 903. As another example, in one or more embodiments, when the Flow Executor Module 202 determines the end user has performed no action on the user interface in a preset amount of time, the dialog box 904 and cloned mouse 906 may be generated and presented on the user interface 800 with instructions for a executing a particular flow. The administrator may set the preset amount of time. In one or more embodiments, the particular flow may be determined by the Flow Executor Module 202 based on at least one of: the location of the mouse cursor, end-user authorization, history, user cookies and user data fetched by a script. Other suitable processes for determining a particular flow may be used.

In one or more embodiments, instructions for executing more than one particular flow may be provided. For example, multiple areas on the user interface may be highlighted or in some other way presented to indicate help with a flow may be provided.

Figure 10:
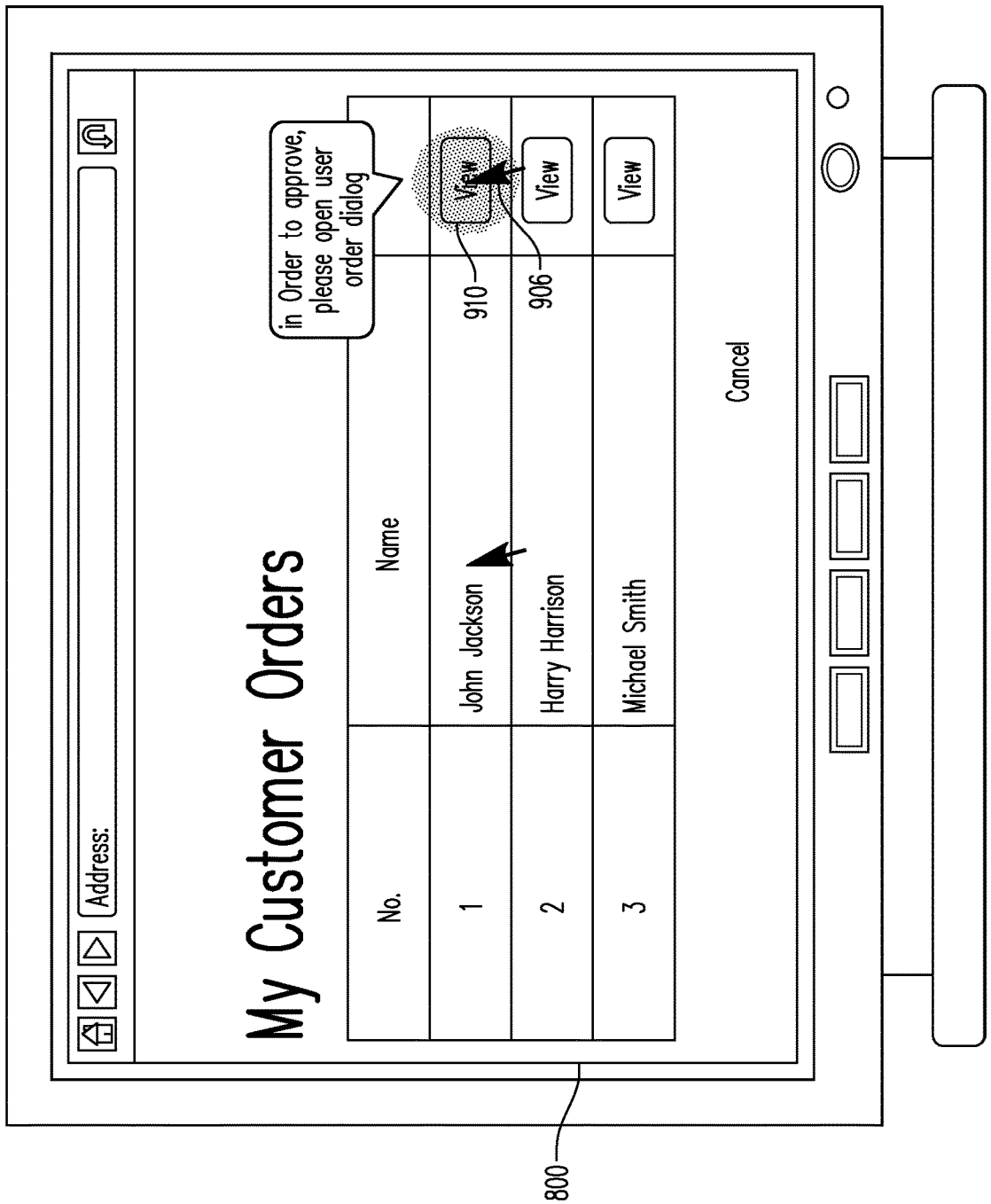
FIG. 10 is an outward view of a graphical interface according to some embodiments.

Then, in S716, the end user is guided to select a flow. For example, as show in FIG. 9, the dialog box 904 stating "in Order to approve, please open user order dialog" is provided. A cloned mouse 906 is presented and moved along a path 908 indicated by the dashed line to guide the end user to select a control 910 to execute the flow 405 of "approval" of the order. The cloned mouse 906 then hovers over the control 910, as shown in FIG. 10. While the control 910 is shown highlighted in FIG. 10, the suggested flow may be indicated to the end user in any other suitable manner. The end user selects the flow 405 in S718.

Then in S720, a step associated with the selected flow is generated by the Flow Executor Module 202. In one or more embodiments, the selected flow is received and analyzed by the Flow Executor Module 202. The Flow Executor Module 202 may then determine a step 404 to generate. In one or more embodiments, the Flow Executor Module 202 may receive information about the current application 135 executing on the web browser 204, and may also receive information about the end user (e.g., which functions the end user is able to access, etc.), and information about what action the end user wants to perform. In one or more embodiments, the end user information may be received when the end user accesses the application 135. Based on this received information, the Flow Executor Module 202 may determine a rule set or flow 405 to execute. In one or more embodiments, the flow 405 may include one or more rules or steps 404 to execute the action. In one or more embodiments, the flow 405 may be stored in a rule set repository 203.

Figure 11:
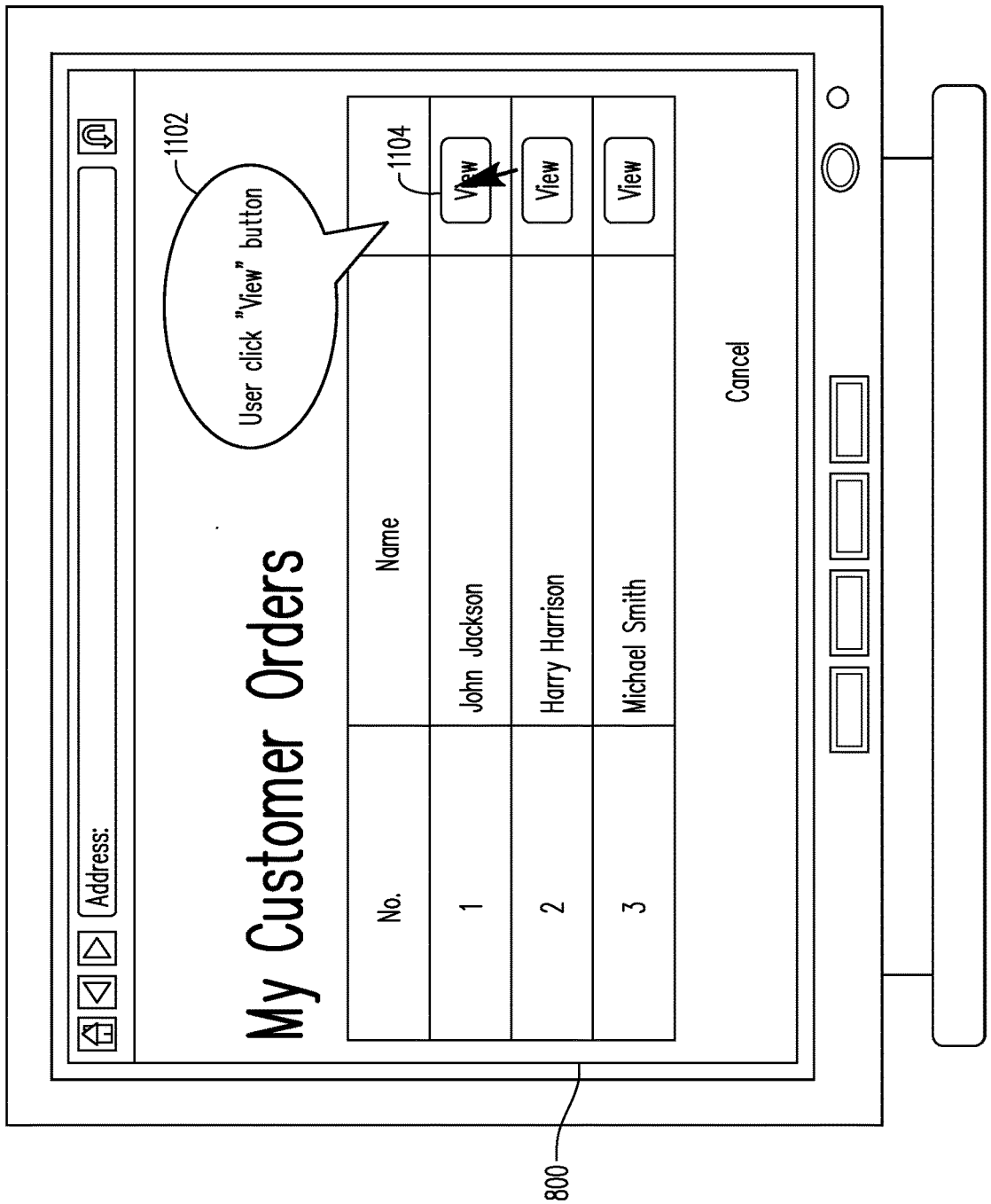
FIG. 11 is an outward view of a graphical interface according to some embodiments.

After the step is generated in S720, the step 404 may be presented on the user interface 800 in S722. For example, as shown in FIG. 11, the step 404 "user click "view" button" is presented in a dialog box 1102 on the user interface 800. Then in S724, an action is received. In one or more embodiments, the end user may perform the action suggested by the dialog box 1102 or may perform another action.

It is then determined in S726 whether a next step is available. In one or more embodiments, when there are no more steps 404 in the flow 405, the process 700 ends at S728.

If it is determined in S726 that another step is available in the flow 405, a next step is generated in S730. The process 700 may then return to S722 and the generated step may be presented on the user interface 800.

Figure 12:
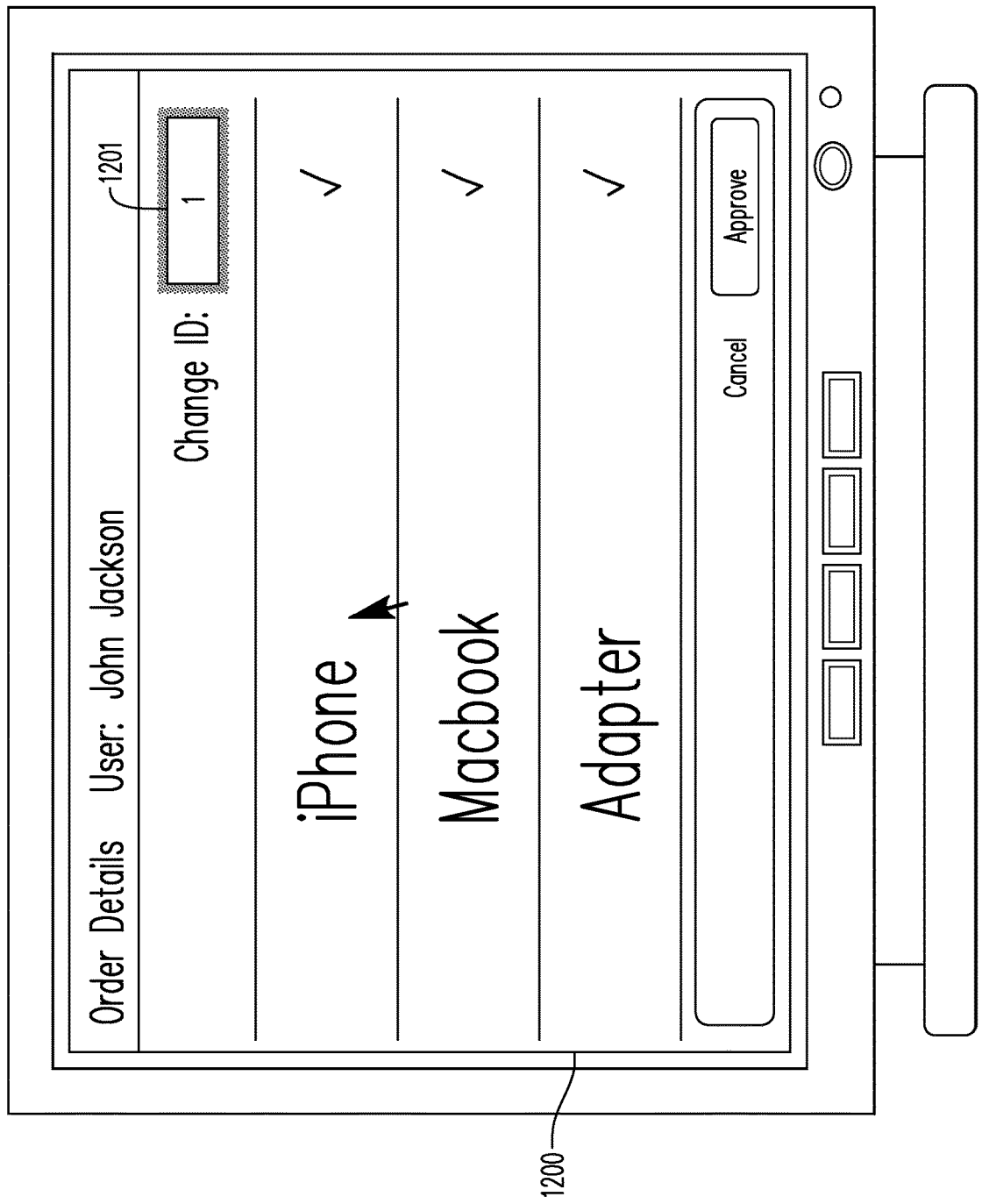
FIG. 12 is an outward view of a graphical interface according to some embodiments.

Continuing with the example, when the user clicks the "view" control 1104 button in S724, a different user interface 1200 is presented as shown in FIG. 12. While in the example described herein, the next generated step is presented on a different user interface 1200 in S722, the next generated step may be presented on the same user interface. In the example shown in FIG. 12, the next step is an option to change the order ID. This option may be displayed by at least one of highlighting the data entry field 1201 and changing the data entry field focus. Other suitable ways to display the option may be employed.

Figure 13:
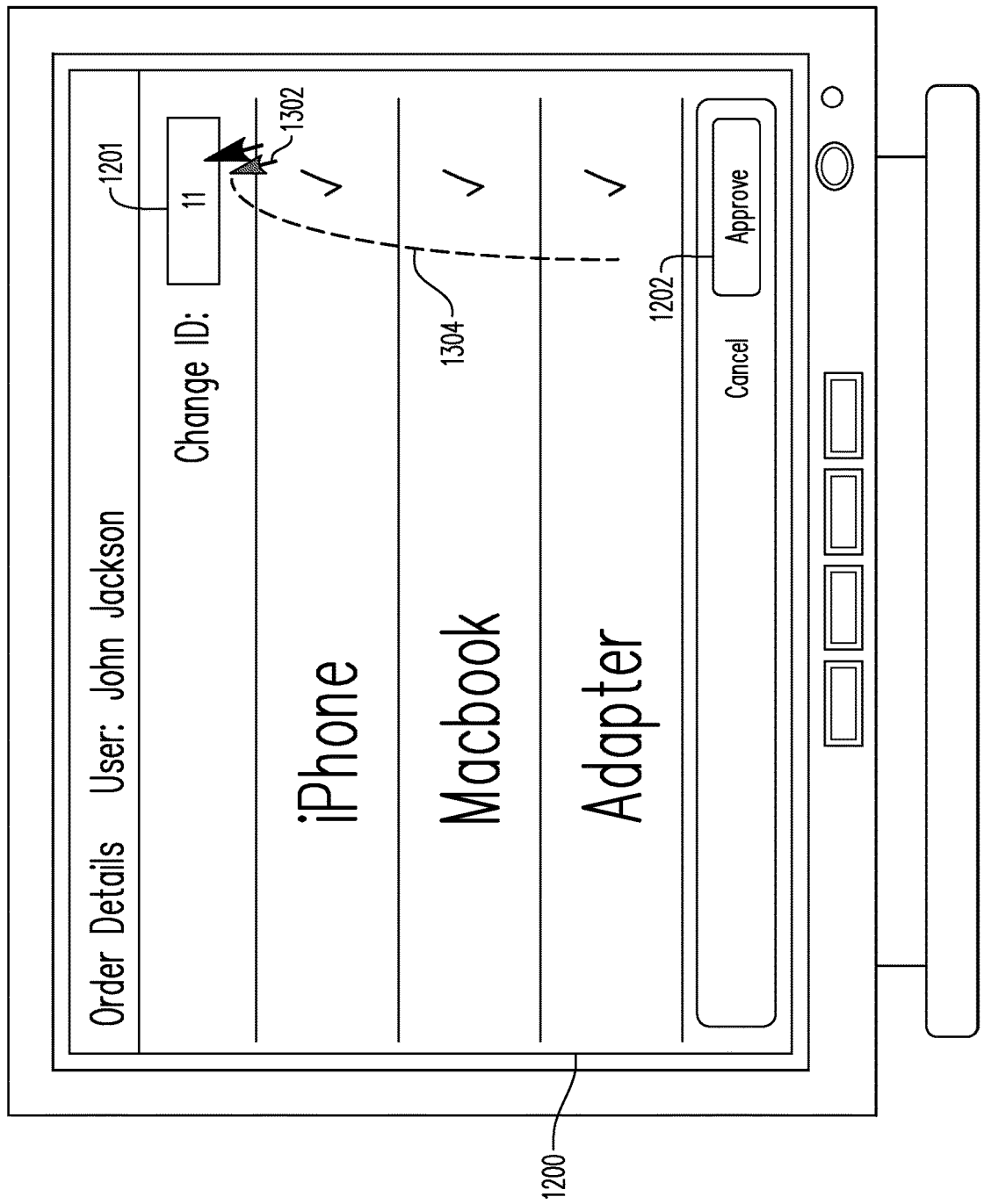
FIG. 13 is an outward view of a graphical interface according to some embodiments.
Figure 14:
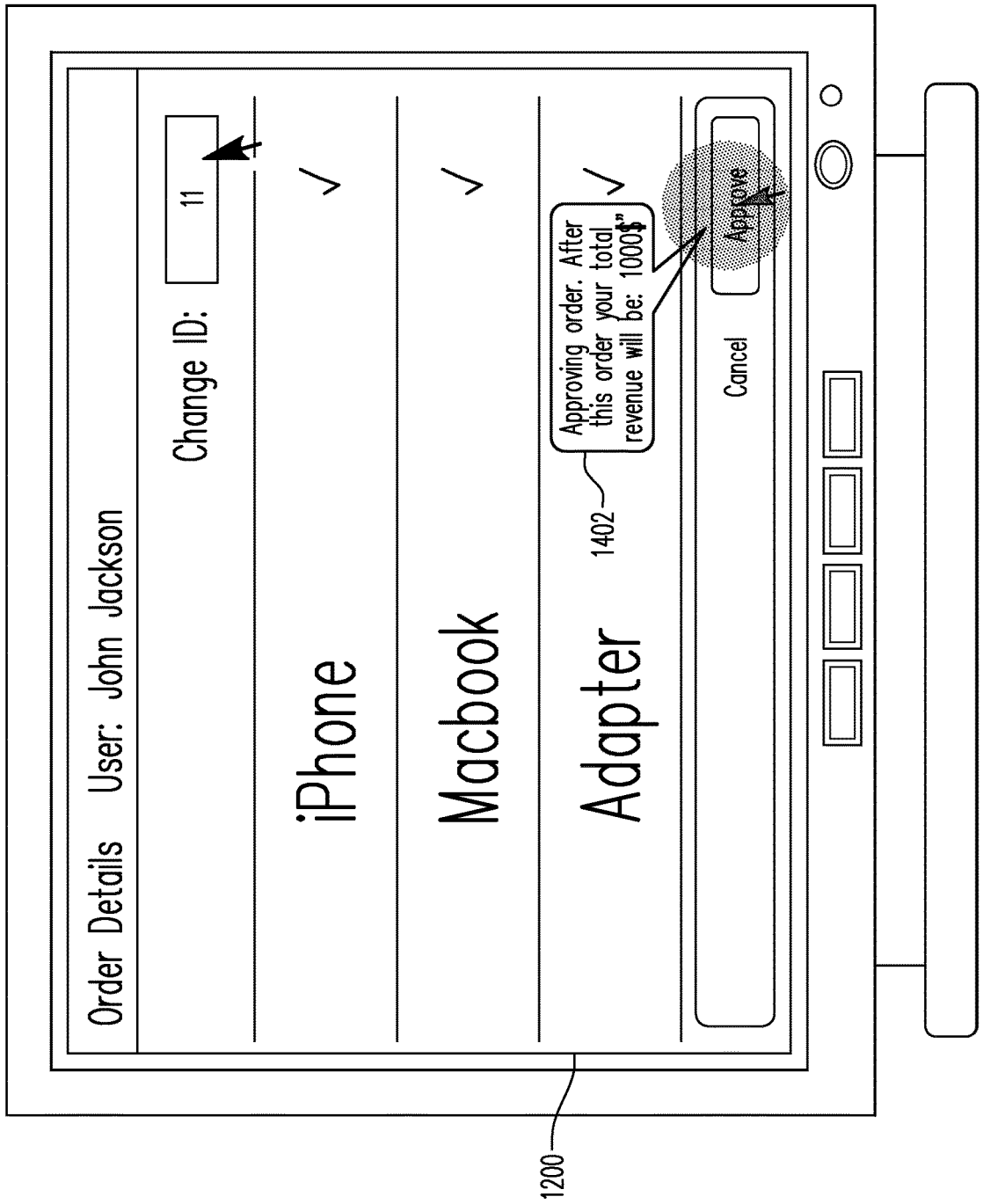
FIG. 14 is an outward view of a graphical interface according to some embodiments.

The action (to change the order ID) is received in S724, and the order ID changes from 1 in FIGS. 12 to 11 in FIG. 13. Then it is determined in S726 that another step is available in the flow 405, and the step is generated in S730 and then presented in S722. In particular, after the user changes the value in the order ID data entry field 1201, the user may be advised to approve the order as the next step. This "approve the order" next step may be displayed on the user interface 1200 as a cloned arrow 1302 and a path 1304 showing where the end user may approve the order (e.g., by selecting the approve control 1202). In one or more embodiments, the cloned mouse 1302 may be used to direct the end user what to do next. The step may be displayed by a text box or any other suitable display. In one or more embodiments, when the cloned mouse 1302 reaches the approve control 1202, a text box 1402 (FIG. 14) may be displayed to indicate the action that may be completed by selecting the approve control 1202. For example, the text box 1402 may display "Approving order." In one or more embodiments, in addition to steps in the flow, the Flow Executor module 202 may also provide other information associated with each step. For example, the Flow Executor module 202 may calculate target revenue after current order approval. In one or more embodiments, this request may be based on a request for data 1516 (FIG. 15) from the backend. In this instance, the text box 1402 may display "Approving order. After this order your total revenue will be 1000$."

In one or more embodiments the process 700 may continue until no other actions in the flow 405 are available.

The inventors note in one or more embodiments, the end user may decide not to perform the action that is associated with the next step. When the received action is different from the next step in the flow 405, the Flow Executor module 202 may dynamically generates a different flow and determine the appropriate next step. For example, instead of approving the order, the end user may change the order ID again.

All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 15:
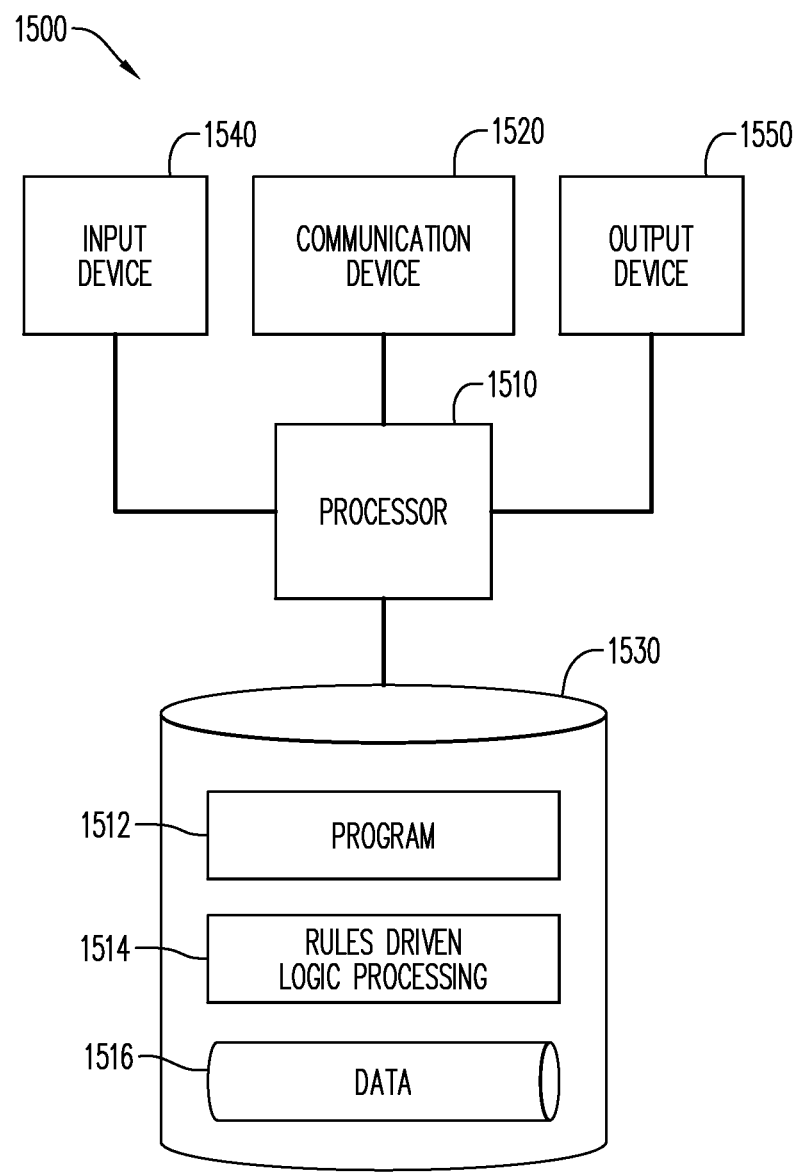
FIG. 15 is a block diagram of a system according to some embodiments.

FIG. 15 is a block diagram of apparatus 1500 according to some embodiments. Apparatus 1500 may comprise a general- or special-purpose computing apparatus and may execute program code to perform any of the functions described herein. Apparatus 1500 may comprise an implementation of one or more elements of system 100. Apparatus 1500 may include other unshown elements according to some embodiments.

Apparatus 1500 includes Flow Executor processor 1510 operatively coupled to communication device 1520, data storage device 1530, one or more input devices 1540, one or more output devices 1550 and memory 1560. Communication device 1520 may facilitate communication with external devices, such as application server 130. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to manipulate graphical user interfaces and to input information into apparatus 1500. Output device(s) 1550 may comprise, for example, a display (e.g., a display screen) a speaker, and/or a printer.

Data storage device/memory 1530 may comprise any device, including combinations of magnetic storage devices (e.g., magnetic tape, hard disk drives and flash memory), optical storage devices, Read Only Memory (ROM) devices, Random Access Memory (RAM) etc.

The storage device 1530 stores a program 1512 and/or flow executor platform logic 1514 for controlling the processor 1510. The processor 1510 performs instructions of the programs 1512, 1514, and thereby operates in accordance with any of the embodiments described herein, including but not limited to processes 300/700.

The programs 1512, 1514 may be stored in a compressed, uncompiled and/or encrypted format. The programs 1512, 1514 may furthermore include other program elements, such as an operating system, a database management system, and/or device drivers used by the processor 1510 to interface with peripheral devices.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of computing devices in communication with one another via any number of other public and/or private networks. Two or more of such computing devices may be located remote from one another and may communicate with one another via any known manner of network(s) and/or a dedicated connection. Each computing device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more computer-readable non-transitory media. Such media non-transitory media may include, for example, a fixed disk, a floppy disk, a CD-ROM, a DVD-ROM, a Flash drive, magnetic tape, and solid state RAM or ROM storage units. Embodiments are therefore not limited to any specific combination of hardware and software.

The embodiments described herein are solely for the purpose of illustration. Those in the art will recognize other embodiments may be practiced with modifications and alterations limited only by the claims.

What is claimed is:

1. A system comprising:
   a display;
   a memory storing processor-executable steps; and
   a flow executor processor coupled to the memory, and operative to execute the processor-executable process steps to cause the system to:
   present a user interface on a display, the user interface including one or more selectable actions;
   present a flow executor indicator;
   in response to a user selection of the flow executor indicator, guide a user to select one of at least one flow presented on the user interface, wherein guiding the user further comprises simulating movement of a cloned cursor and highlighting an area on the user interface to assist in the selection of one of the at least one flow;
   in response to a user selection of the flow, generate, via a flow executor module, at least a first step associated with the selected flow, wherein execution of the at least one step by the user executes the flow; and
   present the at least one step on the user interface.

2. The system of claim 1, further comprising processor-executable process steps to cause the system to:
   receive a first action in response to the presentation of the at least one step; and
   generate, via the flow executor module, in response to the received first action, at least a second step.

3. The system of claim 2, further comprising processor-executable process steps to cause the system to:
   present the second step on the user interface when the second step is one of associated with the selected flow or associated with a different flow.

4. The system of claim 3, further comprising processor-executable process steps to cause the system to:
   receive a second action in response to the presentation of the second step; and
   in response to the received second action, one of generate, via the flow executor module, a third step and wait for the user selection of the flow executor indicator when the received second action completes the flow.

5. The system of claim 1, further comprising processor-executable process steps to cause the system to:
   receive a first action in response to the presentation of the at least one step; and
   wait for the user selection of the flow executor indicator when the received first action completes the flow.

6. The system of claim 1, wherein guiding the user to select one of at least one flow presented on the user interface further comprises processor-executable process steps to cause the system to further present textual instructions.

7. The system of claim 1, further comprising processor-executable process steps to cause the system to:
   present a dialog box after a pre-defined amount of time of inactivity on the user interface, to inquire about launching the flow executor module.

8. The system of claim 1, wherein the user interface is presented in response to the launch of a web browser on a device.

9. The system of claim 1, wherein presentation of the at least one step on the user interface further comprises processor-executable process steps to cause the system to at least one of:
 simulate movement of a cursor, highlight an area on the user interface; and present textual instructions.

10. The system of claim 1, wherein generation of the at least first step on the user interface further comprises processor-executable process steps to cause the system to:
 analyze, via a rule set executor of the flow executor module, an application providing the user interface and user data to determine the at least first step.

11. A computer-implemented method comprising:
 presenting a user interface on a display, the user interface including one or more selectable actions;
 selecting a flow executor indicator;
 guiding a user to select one of at least one flow presented on the user interface in response to selection of the flow executor indicator, wherein guiding the user further comprises simulating movement of a cloned cursor and highlighting an area on the user interface to assist in the selection of one of the at least one flow;
 selecting a flow;
 generating, via a flow executor module, at least a first step associated with the selected flow, wherein execution of the at least one step by the user executes the flow; and
 presenting the at least one step on the user interface.

12. The method of claim 11, further comprising:
 receiving a first action in response to the presentation of the at least one step; and
 generating, via the flow executor module, in response to the received first action, at least a second step.

13. The method of claim 12, further comprising:
 presenting the second step on the user interface when the second step is one of associated with the selected flow or associated with a different flow.

14. The method of claim 13, further comprising:
 receiving a second action in response to the presentation of the second step; and
 in response to the received second action, one of:
  generating, via the flow executor module, a third step; and
  waiting for the user selection of the flow executor indicator when the received second action completes the flow.

15. The method of claim 11, further comprising:
 receiving a first action in response to the presentation of the at least one step; and
 waiting for the user selection of the flow executor indicator when the received first action completes the flow.

16. The method of claim 11, wherein guiding the user to select one of at least one flow presented on the user interface further comprises:
 presenting textual instructions.

17. The method of claim 11, further comprising:
 presenting a dialog box after a pre-defined amount of time of inactivity on the user interface, to inquire about launching the flow executor module.

18. The method of claim 11, wherein the user interface is presented in response to the launch of a web browser on a device.

19. The method of claim 11, wherein presentation of the at least one step on the user interface further comprises:
 simulating movement of a cursor, highlight an area on the user interface; and present textual instructions.

20. The method of claim 1, wherein generating the at least first step on the user interface further comprises:
 analyzing, via a rule set executor of the flow executor module, an application providing the user interface and user data to determine the at least first step.

21. A non-transitory computer-readable medium storing program code, the program code executable by a computer system to cause the computer system to:
 present a user interface on a display, the user interface including one or more selectable actions;
 present a flow executor indicator;
 in response to a user selection of the flow executor indicator, guide a user to select one of at least one flow presented on the user interface, wherein guiding the user further comprises simulating movement of a cloned cursor and highlighting an area on the user interface to assist in the selection of one of the at least one flow;
 in response to a user selection of the flow, generate, via a flow executor module, at least a first step associated with the selected flow, wherein execution of the at least one step by the user executes the flow; and
 present the at least one step on the user interface.

22. The medium of claim 21, further comprising program code to cause the computer system to:
 receive a first action in response to the presentation of the at least one step; and
 generate, via the flow executor module, in response to the received first action, at least a second step.

23. The medium of claim 22, further comprising program code to cause the computer system to:
 present the second step on the user interface when the second step is one of associated with the selected flow or associated with a different flow.

24. The medium of claim 23, further comprising program code to cause the computer system to:
 receive a second action in response to the presentation of the second step; and
 in response to the received second action, one of generate, via the flow executor module, a third step and wait for the user selection of the flow executor indicator when the received second action completes the flow.

25. The medium of claim 21, further comprising program code to cause the computer system to:
 receive a first action in response to the presentation of the at least one step; and
 wait for the user selection of the flow executor indicator when the received first action completes the flow.

26. The medium of claim 21, wherein guiding the user to select one of at least one flow presented on the user interface further comprises program code to cause the computer system to further present textual instructions.

27. The medium of claim 21, wherein presentation of the at least one step on the user interface further comprises program code to cause the system to at least one of:
 simulate movement of a cursor, highlight an area on the user interface; and present textual instructions.

* * * * *